United States Patent [19]

Iizuka et al.

[11] Patent Number: 5,251,317
[45] Date of Patent: Oct. 5, 1993

[54] COMPUTER SYSTEM WITH AN ACCESS CONTROL UNIT FOR RESOURCE

[75] Inventors: Matoi Iizuka, Oome; Hitoshi Kubo, Tanashi, both of Japan

[73] Assignee: Kabushiki Kaisha Toshiba, Kawasaki, Japan

[21] Appl. No.: 469,209

[22] Filed: Jan. 24, 1990

[30] Foreign Application Priority Data

Jan. 25, 1989 [JP] Japan .................. 1-15510

[51] Int. Cl.⁵ .............................................. G06F 9/46
[52] U.S. Cl. .................. 395/650; 364/DIG. 1; 364/230.3; 364/230; 364/281.3; 364/280.281.7
[58] Field of Search ................ 395/650, 725, 800

[56] References Cited
U.S. PATENT DOCUMENTS

| | | | |
|---|---|---|---|
| 4,399,504 | 8/1983 | Obermarck et al. | 395/650 |
| 4,604,694 | 8/1986 | Hough | 395/650 |
| 4,742,447 | 5/1988 | Duvall et al. | 395/375 |
| 4,815,030 | 3/1989 | Cross et al. | 395/600 |
| 4,941,084 | 7/1990 | Terada et al. | 395/650 |

Primary Examiner—Kevin A. Kriess
Attorney, Agent, or Firm—Finnegan, Henderson, Farabow, Garrett & Dunner

[57] ABSTRACT

In a computer system of the multi-task type, when a plurality of tasks execute related data processings, ID data specifically provided for the data processings is generated, and recorded. With the recorded ID, an exclusive control and a shared control in the access to a predetermined resource are performed. When, after a main task records ID data and makes an access to a resource, another task requests the access to the resource on the basis of another ID data, the access to the resource is prohibited or the resource rejects the access to it. When a sub task executing the data processing related to that executed by the main task makes an access to the resource by using the request and the ID data both supplied from the main task, the sub task can access to the resource.

8 Claims, 7 Drawing Sheets

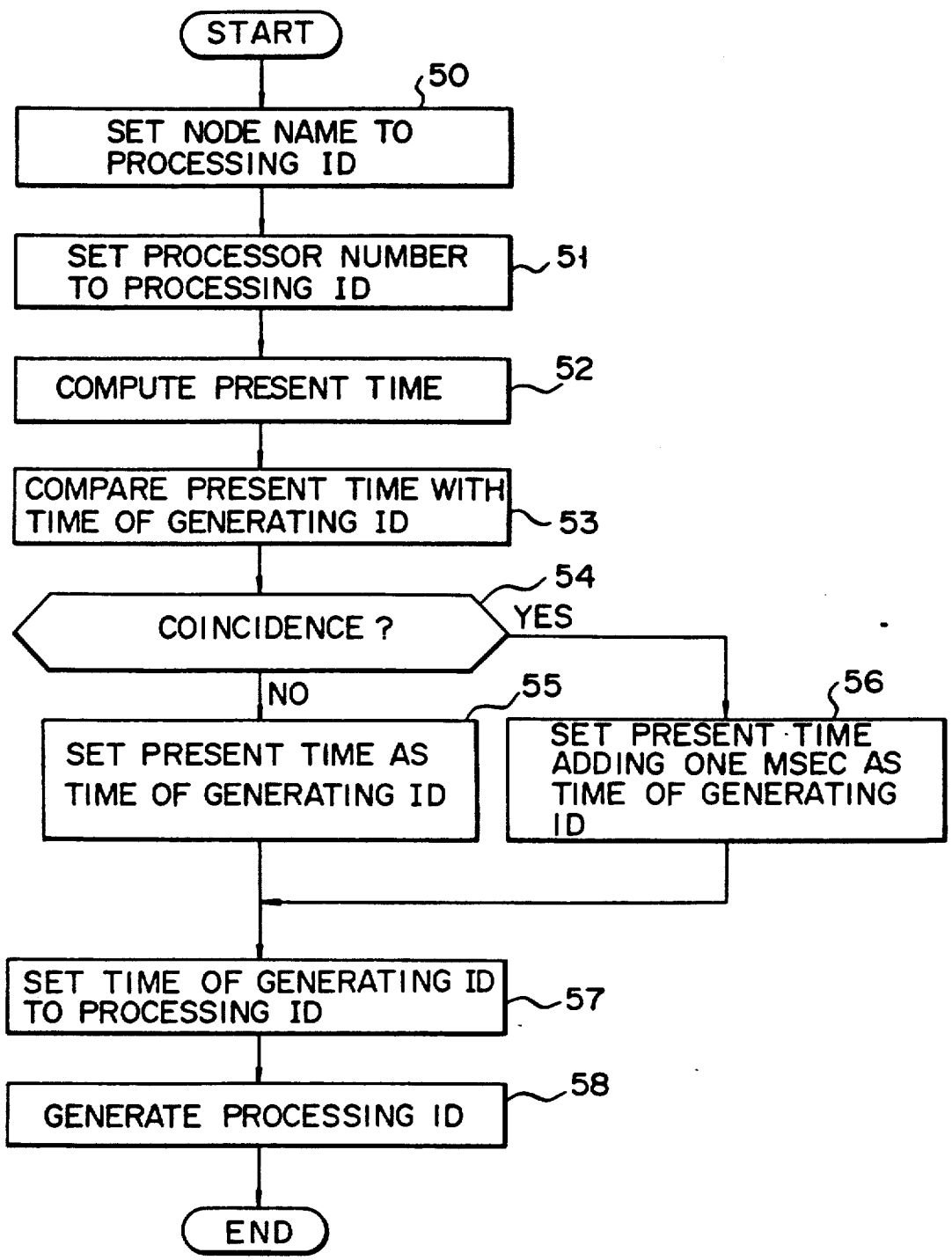
F I G. 5

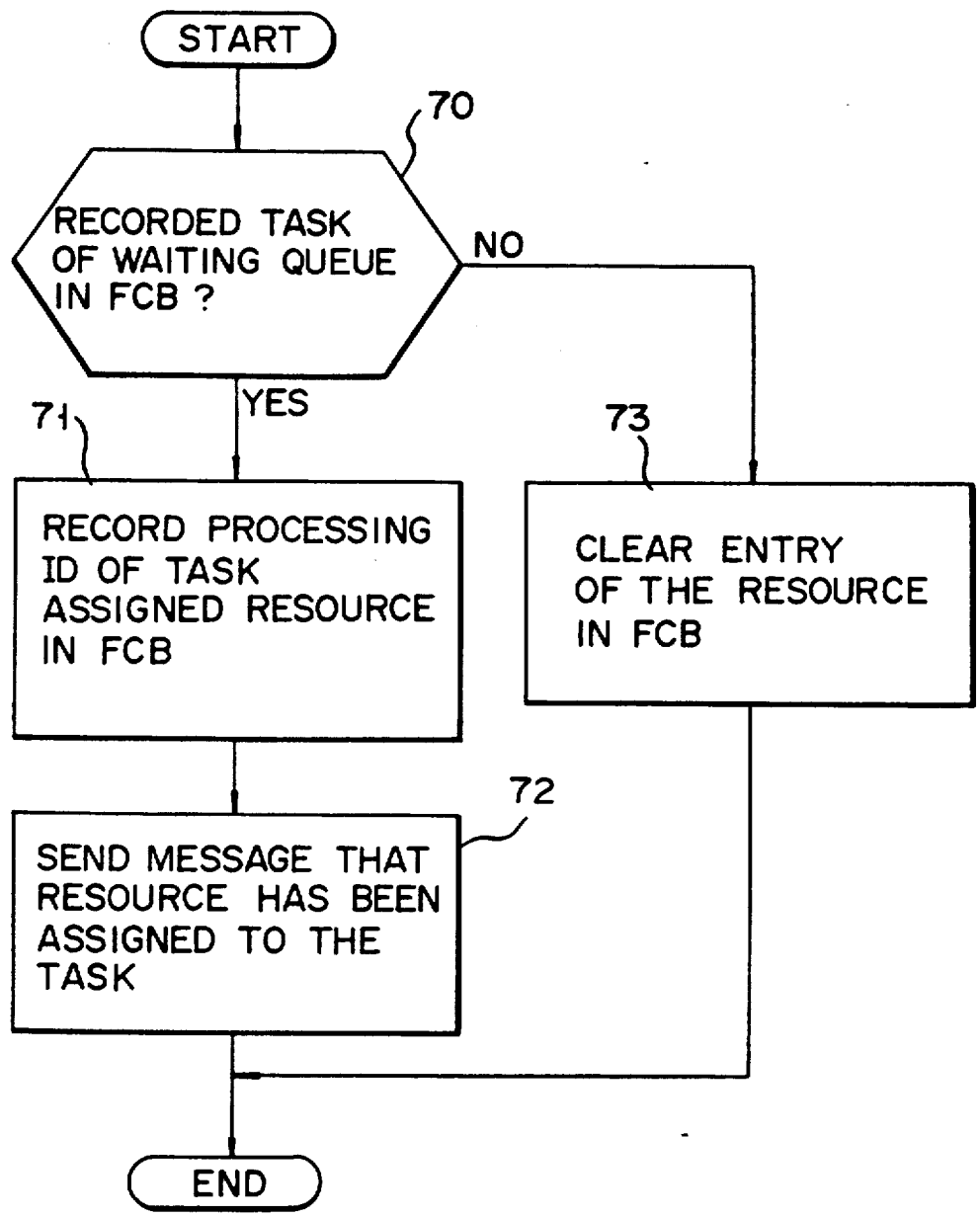
F I G. 7

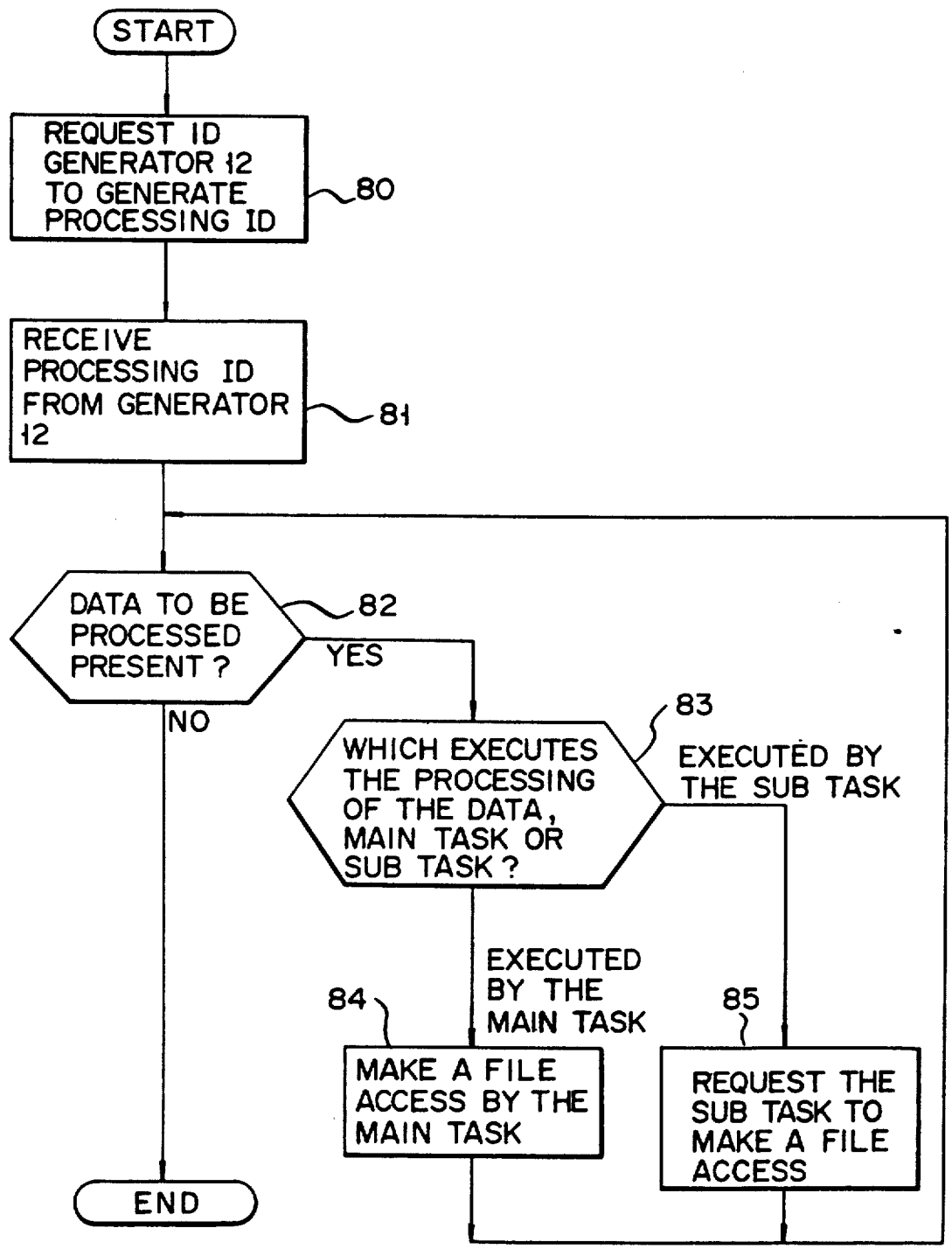
F I G. 8A

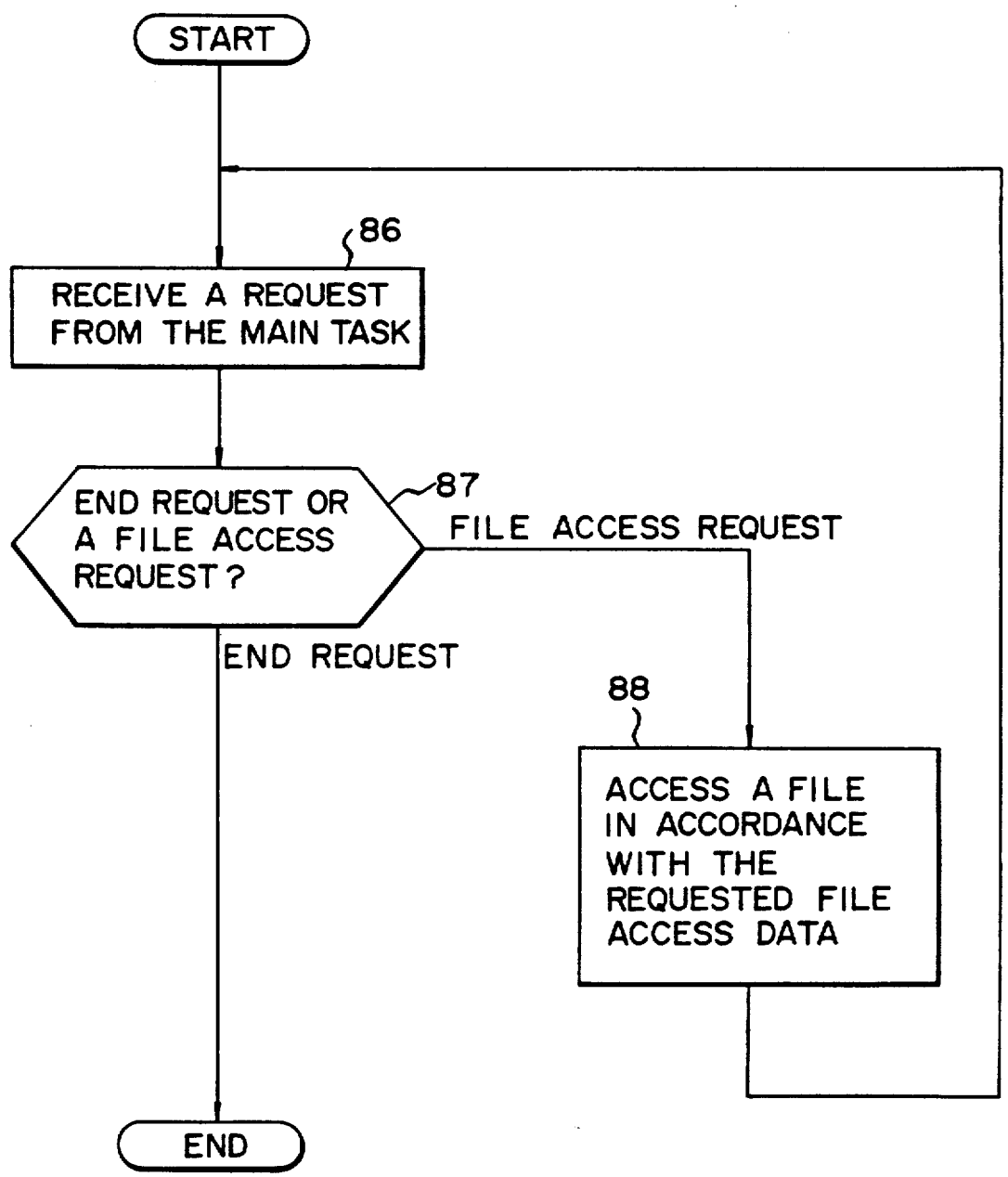
F I G. 8B

ND UNIT FOR RESOURCE

COMPUTER SYSTEM WITH AN ACCESS CONTROL UNIT FOR RESOURCE

BACKGROUND OF THE INVENTION

1. Field of the Invention

The present invention relates to a computer system with an access control unit for controlling a resource shared by a plurality of tasks in an exclusive manner or in a shared manner.

2. Description of the Related Art

In a computer system employing a multi-task OS (operating system) a plurality of tasks share a single resource, and each task may access the resource if required. Here, the resource has a file unit, such as a hard disk unit.

The computer system includes a file access controller system. When a task issues an access request to the file unit, the file access controller receives the access request and accesses a record specified by the access request from the file unit. More specifically, the file access controller checks whether or not the record specified by the access request has been recorded in a file control block (FCB) as previously provided. If it is recorded, the file access controller checks whether or not the task number of the task locking the record is the same as that of the task making the access request. Where a record is previously assigned to the task, its task number and a resource name (record name) are recorded in the FCB. Accordingly, when the recorded resource name is coincident with that of the task making the access request, the resource has been assigned and locked by the task making the access request.

When the record under the access request is not recorded in the FCB, the file access controller records a task number of the task and a resource number in the FCB, locks the record, and accesses the record from the file unit. When another task makes an access to the locked record, the file access controller performs an exclusive control in which it prohibits the resource from being accessed until the record is released from its locked state. More exactly, the file access controller compares the task number of the task making an access request and the task number recorded in the FCB. If those task numbers are not coincident with each other, the file access controller places the task requesting the access in a wait status until the record is released from its locked state.

As described above, the file access controller makes the exclusive control of a resource which is assigned to a task and locked, in accordance with a task number recorded in the FCB. In the multi-task system, when a first task (main task) and a second task (sub task), which execute related data processings, access a resource shared by them, the resource (record) under the access request made by the main task is locked, and rejects the access by another task. That is, it is placed in an exclusive control mode. Accordingly, if the sub task accesses the record locked by the main task, the access by the sub task is rejected until the record is released from the locked state. Thus, the file access controller does not consider the access request by the sub task to be equal to that by the main task, because the task numbers are different, and places the resource in the exclusive control mode.

Where the related tasks are present, and those tasks access the shared resource, if a deadlock phenomenon occurs that the access to the resource by the second task is prohibited by the first task, the efficiency of access to the resource is reduced, and consequently data processing efficiency is reduced.

SUMMARY OF THE INVENTION

Accordingly, it is an object of the present invention to provide a computer system with an access control unit for controlling a resource shared by a plurality of tasks in an exclusive manner or a shared manner, in which a deadlock phenomenon, in which access to a resource by one task is prohibited by another task when this other task access the resource, does not occur and that further improves the processing efficiency of access to the resource.

To achieve the above object, there is provided a computer system of the multi-task type comprising: an ID data generator unit for generating ID data corresponding to related data processings in response to a request by a first task of a plurality of tasks which execute the related data processings and share a resource; an access control block unit with a table in which, when the first task issues a request to access the resource, if the name of the resource to be accessed is not recorded, the resource name required for controlling the access to the resource and the ID data generated by the ID data generator unit are recorded in the table; a first access controller in which, when the first task issues a request to access the resource, if the ID data recorded in the access control block unit is coincident with the ID data from the first task, the first access controller accesses the resource to be accessed, which is recorded in the access control block unit; and a second access controller in which, when of the plurality of tasks, a second task, not the first task, issues a request to access the resource, the second access controller compares the ID data recorded in the access control block unit with the ID data from the second task, if the ID data are coincident with each other, the second access controller accesses the resource recorded in the access control block unit, if the ID data is not coincident with each other, the second access controller prohibits any of the plurality of tasks from accessing the resource.

BRIEF DESCRIPTION OF THE DRAWINGS

FIGS. 5, 6, 7, 8A and 8B show flow charts useful in explaining the operations of the computer system according to the embodiment of the present invention.

DETAILED DESCRIPTION OF THE PREFERRED EMBODIMENTS

Figure 1:
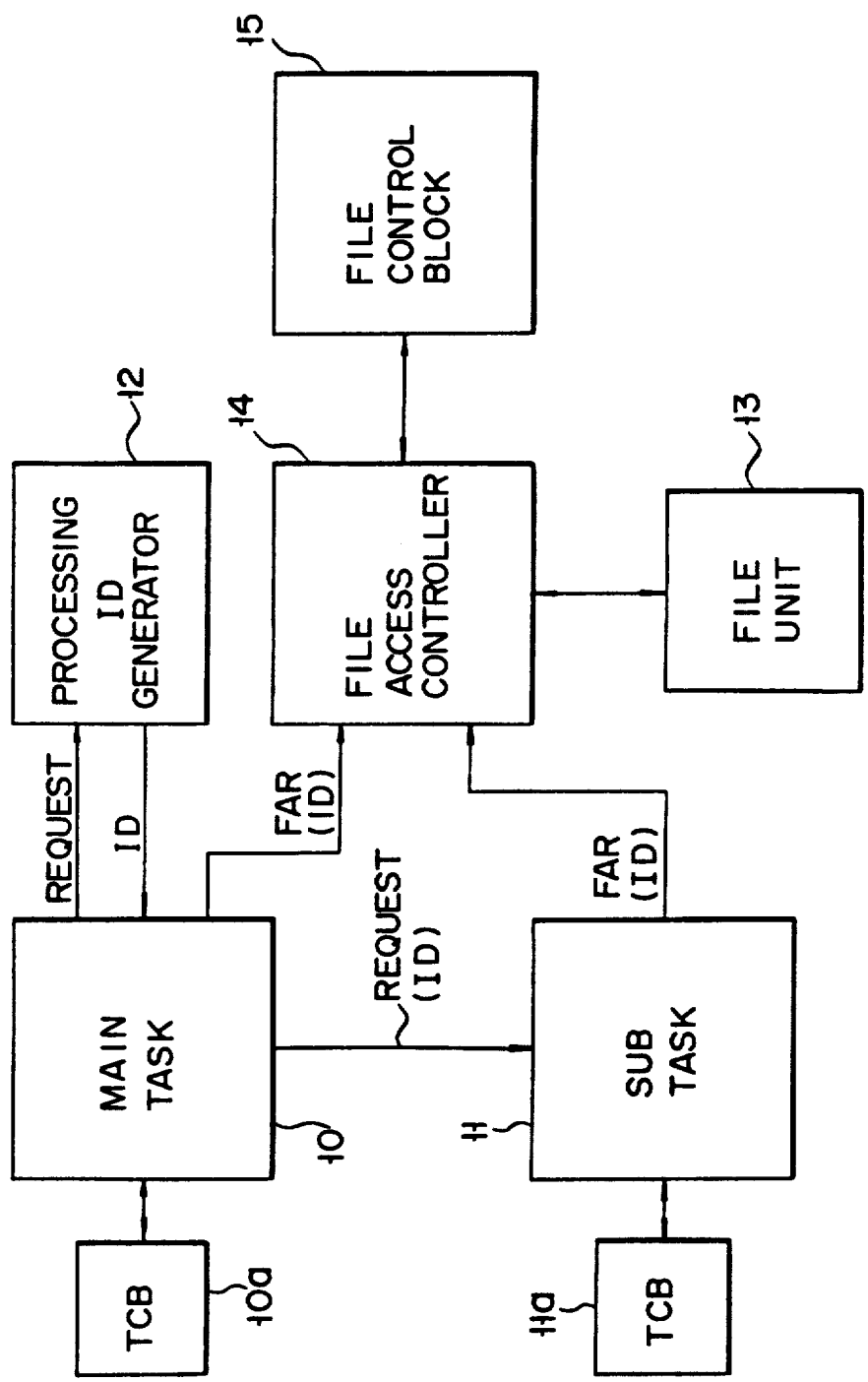
FIG. 1 is a block diagram showing a key portion of a computer system according to an embodiment of the present invention.

FIG. 1 shows a block diagram showing a key portion of an arrangement of a computer system according to an embodiment of the present invention. As shown, the computer system is provided with a main task 10 and a sub task 11, which execute related data processing operations in a multi-tasking OS. The task 10 performs a part of a data processing operation, the task 11 performs the remaining part of the data processing operation. The tasks 10 and 11 cooperate, as if they were a single data-processing unit.

The tasks 10 and 11 are respectively provided with task control blocks (TCBs) 10a and 11a. The TCBs are for controlling many items including the order of executing the systematic operations of the tasks, conditional waiting, and the like.

A processing ID generator 12 generates processing IDs data (referred simply to as ID) in response to a request by the main task 10. Each ID is unique identifying data corresponding to the related data processings as that are executed by the tasks 10 and 11. The ID is used for an exclusive control and a shared control of a resource shared by the tasks 10 and 11.

The instant computer system contains a resource necessary for the data processings by the tasks 10 and 11, for example, a file unit 13 for recording files. The file unit 13 may include of a hard disk unit, for example. Files of various types, each consisting of many records, are recorded onto and reproduced from the hard disk. A file access controller 14 controls an access to the file unit 13 in response to an access request issued from the task 10 or 11. The file access controller 14 exercises exclusive control or shared control in the access to the file unit 13, while referencing a file control block (FCB) 15.

Figures 2, 3, 4:
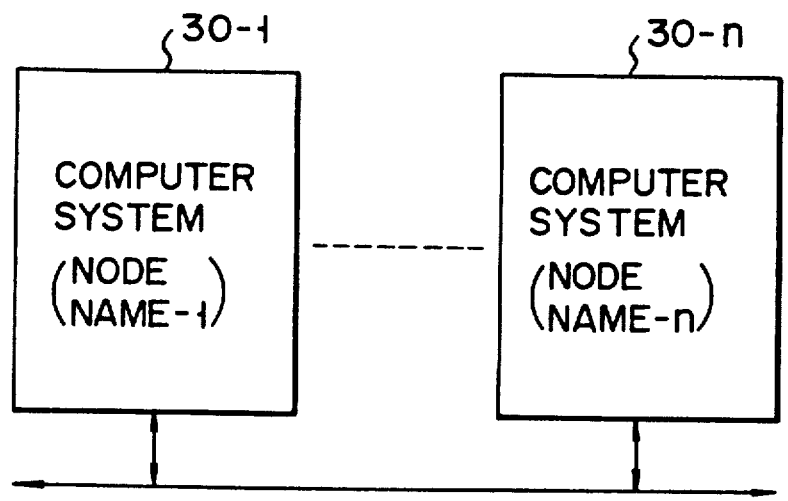
FIG. 2 shows an explanatory diagram useful in explaining a file control block used in the computer system according to the embodiment of the present invention.
FIG. 3 shows a block diagram showing a network system consisting of computer systems according the embodiment of the present invention.
FIG. 4 shows a processing ID used in the computer system according to the embodiment of the present invention.

The FCB 15 is a table for recording the control data used when the controller 14 makes an access to the file unit 13. As shown in FIG. 2, the items to be recorded in the FCB 15 are a resource name of a resource to be accessed, a processing ID which is essential to the present invention, and a waiting queue for recording a task waiting in the access queue.

As shown in FIG. 3, the present computer system 30-1 cooperates with other similar computer systems 30-2, . . . , 30-n, to form a network system (network architecture). The computer systems 30-1 to 30-n are provided with nodes name-1 to name-n, respectively. Data communication is done among the computer systems through the network.

Operations of the instant computer system are described below.

FIGS. 8A and 8B generally show processing flows of the main task 10 and the sub task 11, respectively. In operation, as shown in FIG. 8A,, for executing a predetermined data processing operation, the main task 10 requests the ID generator 12 to generate ID identifying the data processing operation (step 80). In response to the request, the generator 12 generates the processing ID, and transfers it to the main task 10 (step 81). The ID generator 12 generates the ID, as shown in a flowchart of FIG. 5. The ID consists of a node name, a CPU number, and the time of generating the ID, as shown in FIG. 4.

In FIG. 5, the generator 12 sets a node name-1 of the computer system 30-1 in the network system shown in FIG. 3, in the processing ID (step 50). Further, the generator 12 sets a processor (CPU) number in the ID (step 51). The CPU number identifies the CPU allotted to the main task 10. The generator 12 also computes, the present time, or the time of the ID generation. Preferably, the generator 12 computes milli-second, second, minute, hour, and date for the time of ID generation. In other words, the generator 12 computes the present time and compares it with the latest time of generating the ID (steps 52 and 53). When those times are not coincident with each other, the generator 12 sets the present time as the time of generating the ID in the processing ID (steps 54 and 55). When those times are coincident with each other, the generator 12 sets "the present time + 1 milli-second" as the time of generating the ID in the processing ID (steps 54 and 56).

Figure 6:
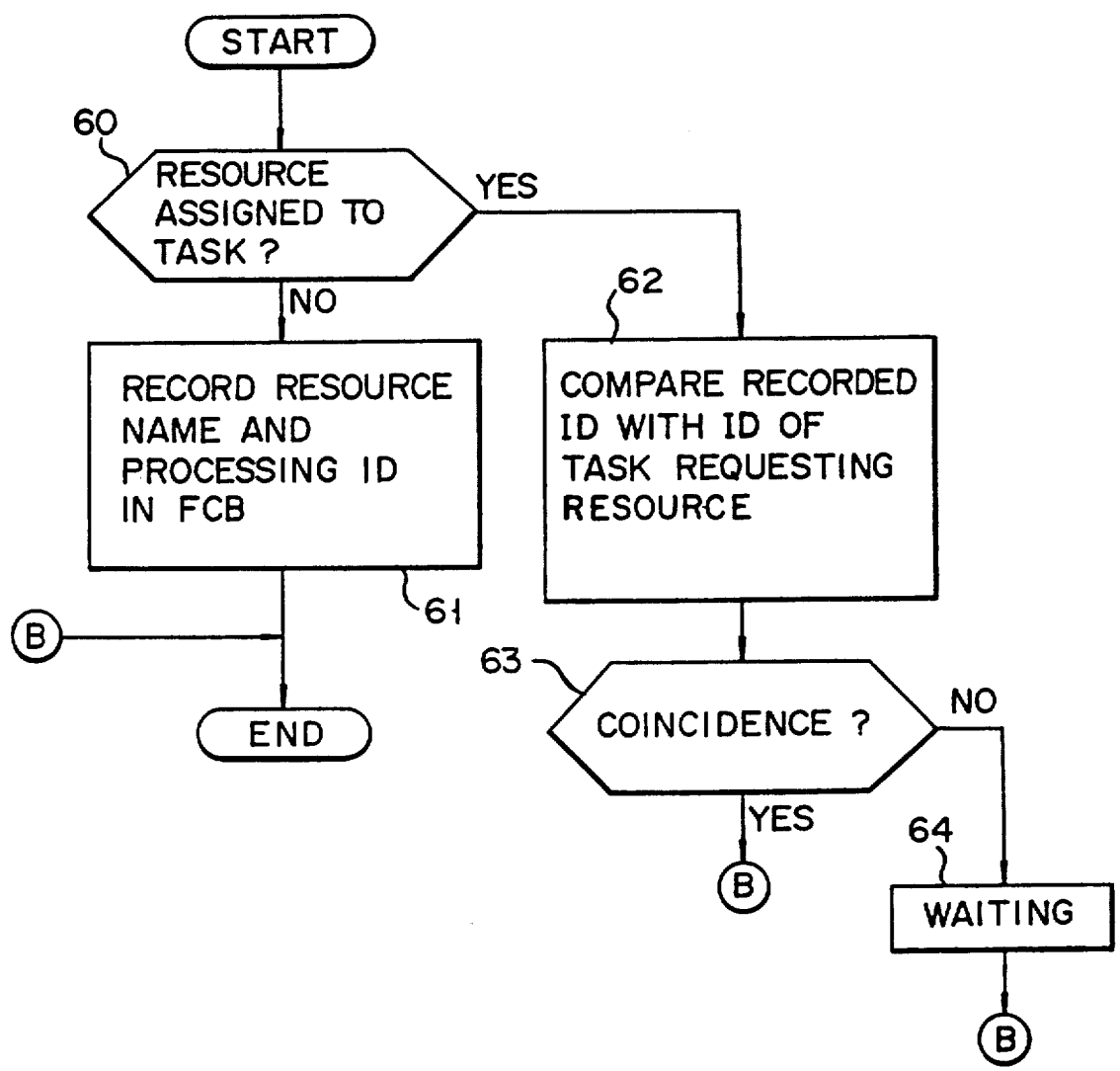

The main task 10 checks whether or not data to be processed is present (steps 82 in FIG. 8A). If there is no data to be processed, the processing flow ends. If the data processing is continued, the main task 10 determines if the data processing operation is to be executed by the main task or by the sub task 11 (FIG. 8A, step 83). If the main task 10 executes the data processing operation, the main task 10 issues a file access request (FAR), which is necessary for executing the data processing operation as specified by the ID, to the file access controller 14 (step 84 in FIG. 8A). At this time, the main task 10 outputs the FAR including the ID transferred from the generator 12, to the controller 14. The controller 14 checks whether or not a file (record) under the access request is recorded in the file unit 13 (FIG. 6, step 60). When it is not recorded, the controller 14 records a name of the record under the access request and the ID specified by the main task 10, in the FCB 15 (step 61). In this case, the name of the record under the access request is recorded as the resource name of the FCB 15. The controller 14 locks the record recorded in the FCB 15, accesses the record in the file unit 13, and transfers it to the main task 10.

When the record under the access request is recorded in the file unit 13, the controller 14 checks whether or not the ID is present or absent in the FCB 15. If it is present, the controller 14 checks whether or not the recorded ID is coincident with the ID from the main task 10 (step 62). It both the ID are coincident with each other, the controller 14 accesses the record under the access request in the file unit 13, and transfers it to the main task 10. When the IDs are not coincident, the record under the access request has been locked by another task (whose ID is different from that of the main task 10). In this case, accordingly, the controller 14 places the main task 10 in a waiting state until the record is released from its locked state (step 64). That is, the controller 14 records the main task 10 requesting an access to the record in the waiting queue of the FCB 15. As a result, the main task 10 queues up for the access to the record till the record is released from its locked state.

The controller 14 executes the processing for releasing the resource (record) for the task, as shown in FIG. 7. The controller 14 checks whether or not a task is recorded in the waiting queue in the FCB 15 (step 70). In other words, the controller 14 checks whether or not there is a task queuing up for the assignment of a given resource to the task. If such a task is recorded, the controller 14 records the processing ID of the task requesting the resource assignment in the FCB 15, and sends to the task a message that the resource has been assigned to the task (steps 71 and 72). When the task is not recorded in the waiting queue, the controller 14 deletes the entry of the resource from the FCB 15 (step 73). In this way, the given resource is set in a released condition in which the resource is not assigned to any of the tasks.

When the step 83 in FIG. 8A decides that the sub task 11 should executes the data processing operation, the main task 10 requests the sub task 11 to execute the data processing operation (step 85 in FIG. 8A). The sub task 11 is for executing an operation related to the data of the main task 10 (for example, a part of the whole of an operation), and receives the processing ID together with a request (step 86 in FIG. 8B). The sub task 11 requests the, controller 14 to access the same record as that for which the access is requested by the main task 10 (step 88).

The controller 14 compares the processing ID from the sub task 11 with the processing ID from the main task 10 that is recorded in the FCB 15 (step 62 in FIG. 6). When both the IDs are coincident with each other, the controller 14 accesses the record in the file unit 13, to which access is requested by the sub task 11. The sub task 11 accesses the record locked on the basis of the processing ID of the main task 10, as the main task 10 does. When those IDs are not coincident, the sub task 11 is set in a waiting state until a resource is assigned to it (step 64).

In this way, in executing a given data processing operation, the resource is subjected to an exclusive control on the basis of the processing ID allotted to that data processing operation. That is, when a resource requested by a task is assigned to the task, the processing ID of the task is recorded in the FCB 15. Accordingly, the assigned resource is locked, and rejects the access to it by another task.

Even if the ID assigned to the main task 10 and recorded in the FCB 15 has locked the resource, and the main task 10 therefore accesses this resource, the sub task 11 can access to the same resource, provided the same ID is assigned to the sub task 11. In other words, two or more tasks, which co-operate to perform data-processing, can access to the same resource only if their IDs are identical.

What is claimed is:

1. A computer system of multi-task type, comprising:
   a plurality of task means including a main task means and a sub task means, which execute related data processing operations and share a resource, the main task means for outputting an ID data and a resource name when accessing the resource, for requesting the sub task means to execute a related data processing operation and for transferring the ID data necessary to access the resource to the sub task means;
   ID data generator means for generating the ID data corresponding to the related data processing operation in response to a request by the main task means;
   access control block means for storing the resource name of the resource to be accessed by the main task means and the sub task means and for storing the ID data generated by the ID data generator means;
   access controller means for accepting the ID data and the resource name from the main task means and the sub task means, for checking the ID data and the resource name stored in the access control block means, and for accessing the resource when the accepted ID data is coincident with the stored ID data corresponding to the resource.

2. The computer system according to claim 1, further comprising another task means, different from the main task means and the sub task means, for executing a data processing operation different from the related data processing operation, the ID data generator means generating a second ID data different from the ID data output from the main task means, in response to a request made by the other task means, the other task means for outputting the other ID data and the resource name when the other task means accesses the resource, and the access control means including means for prohibiting the other task means from accessing the resource when the other ID data is not coincident with the ID data corresponding to the resource stored in the access control block means.

3. The computer system according to claim 1, wherein said ID data generator means includes means for responding to the request by the main task means to generate the ID data including a processor number assigned to the main task means and the time of ID generation.

4. The computer system according to claim 1, wherein the access control block means includes a table for storing a waiting queue of the main or the sub task means, as well as the resource name and the ID data, when the resource is locked in accordance with the access request made by the main or the sub task means.

5. The computer system according to claim 1, wherein the access controller means includes a recording means for, when the main task means issues an access request to access the resource and another task means has locked the resource by means of an ID data different from an ID data from the main task means, placing the main task means in a wait queue and recording the placement in the access control block means.

6. The computer system according to claim 1, wherein the access controller means includes a recording means for, when the sub task means issues an access request to access the resource, and the ID data from the sub task means is not coincident with the ID data stored in the access control block means, prohibiting the access to the resource, and for placing the sub task means in a waiting queue, and for recording the placement in said access control block means.

7. The computer system according to claim 1, wherein the sub task means contained in said plurality of task means includes means for generating an access request to access the resource on the basis of the request from the main task means and the ID data, the access controller means includes means for comparing the ID data from the sub task means with the ID data stored in the access control block means, and if the ID data are coincident, for accessing the resource stored in the access control block means, and if the ID data are not coincident, for prohibiting accessing of the resource.

8. The computer system according to claim 1, wherein the resource is a file unit storing files, and wherein the access controller means includes means for accessing a predetermined file in the file unit in accordance with the request from the main task means and the sub task means and the ID data.

* * * * *

UNITED STATES PATENT AND TRADEMARK OFFICE
CERTIFICATE OF CORRECTION

PATENT NO. : 5,251,317
DATED : October 05, 1993
INVENTOR(S) : Matoi IIZUKA et al.

Page 1 of 3

It is certified that error appears in the above-indentified patent and that said Letters Patent is hereby corrected as shown below:

On the title page:
In the Abstract, line 11 change "sub task" to --subtask--.

In the Abstract, line 14, change "sub task" to --subtask--.

Claim 1, column 5, line 39, change "sub task" to --subtask--.

Claim 1, column 5, line 43, change "sub task" to --subtask--.

Claim 1, column 5, lines 45-46, change "sub task" to --subtask--.

Claim 1, column 5, line 53, change "sub task" to --subtask--.

Claim 1, column 5, line 58, change "sub task" to --subtask--.

UNITED STATES PATENT AND TRADEMARK OFFICE
CERTIFICATE OF CORRECTION

PATENT NO. : 5,251,317
DATED : October 05, 1993
INVENTOR(S) : Matoi IIZUKA et al.

It is certified that error appears in the above-indentified patent and that said Letters Patent is hereby corrected as shown below:

Claim 2, column 6, line 3, change "sub task" to --subtask--.

Claim 4, column 6, line 24, change "sub task" to --subtask--.

Claim 4, column 6, line 27, change "sub task" to --subtask--.

Claim 6, column 6, line 38, change "sub task" to --subtask--.

Claim 6, column 6, line 42, change "sub task" to --subtask--.

Claim 7, column 6, line 46, change "sub task" to --subtask--.

Claim 7, column 6, line 51, change "sub task" to --subtask--.

UNITED STATES PATENT AND TRADEMARK OFFICE
CERTIFICATE OF CORRECTION

PATENT NO. : 5,251,317
DATED : October 05, 1993
INVENTOR(S) : Matoi IIZUKA et al.

It is certified that error appears in the above-indentified patent and that said Letters Patent is hereby corrected as shown below:

Claim 8, column 6, line 61, change "sub task" to --subtask--.

Signed and Sealed this

Thirteenth Day of September, 1994

Attest:

BRUCE LEHMAN

Attesting Officer

Commissioner of Patents and Trademarks